(12) United States Patent
Seo et al.

(10) Patent No.: US 11,764,499 B2
(45) Date of Patent: Sep. 19, 2023

(54) BLOCK TERMINAL

(71) Applicant: HYUNDAI MOBIS Co., Ltd., Seoul (KR)

(72) Inventors: Yeong Woo Seo, Busan (KR); Hye Seong Yang, Gwangju (KR); Seong Jun Hwang, Yongin-si (KR); Jung Kyu Yim, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 348 days.

(21) Appl. No.: 17/014,921

(22) Filed: Sep. 8, 2020

(65) Prior Publication Data

US 2021/0075131 A1    Mar. 11, 2021

(30) Foreign Application Priority Data

Sep. 10, 2019    (KR) .................. 10-2019-0112490

(51) Int. Cl.
*H01R 9/24*    (2006.01)
*H01R 9/16*    (2006.01)

(52) U.S. Cl.
CPC ............. *H01R 9/2458* (2013.01); *H01R 9/16* (2013.01)

(58) Field of Classification Search
CPC ...... H01R 9/2458; H01R 9/16; H01R 9/2408; H01R 4/2404; H01R 4/26; H01R 13/5213; H01R 13/639; H02K 5/225
See application file for complete search history.

(56) References Cited

U.S. PATENT DOCUMENTS

| | | | |
|---|---|---|---|
| 8,608,515 B2 * | 12/2013 | Tate ................. | B29C 45/14467 439/937 |
| 11,165,176 B2 * | 11/2021 | Seo ......... | H01R 9/223 |
| 2002/0042231 A1 * | 4/2002 | Brooks ............... | H01R 13/719 439/709 |
| 2018/0118138 A1 * | 5/2018 | Tsukamoto ......... | H01B 7/0045 |

FOREIGN PATENT DOCUMENTS

| CN | 109104033 A | * 12/2018 | ............. H02K 5/225 |
|---|---|---|---|
| KR | 10-2020-0035665 | 4/2020 | |
| WO | WO-2013146433 A1 | * 10/2013 | ......... H02K 11/0005 |

OTHER PUBLICATIONS

Machine Translation CN_109104033_A, (Dec. 28, 2018) (Year: 2022).*
Machine Translation WO_2013146433_A1, (Oct. 3, 2013) (Year: 2022).*

* cited by examiner

*Primary Examiner* — Travis S Chambers
(74) *Attorney, Agent, or Firm* — H.C. Park & Associates, PLC

(57) ABSTRACT

A block terminal including a plurality of bus bars including ring-shaped connection terminals at both ends thereof; a block base formed to surround bodies of the plurality of bus bars excluding the connection terminals and provided with a slit passing through a surface thereof; and a housing cover formed to surround a surface of the block base and detachably attached to the block base.

16 Claims, 7 Drawing Sheets

BLOCK TERMINAL

CROSS-REFERENCE TO RELATED APPLICATION

This application claims priority from and the benefit of Korean Patent Application No. 10-2019-0112490, filed on Sep. 10, 2019 which is hereby incorporated by reference for all purposes as if set forth herein.

BACKGROUND

Field

Exemplary embodiments relate to a block terminal, and more particularly, to a block terminal for effectively connecting terminals of adjacent objects in a driving motor of a vehicle without fastening bolts.

Discussion of the Background

In block terminals according to the related art, a problem (e.g., dielectric breakdown) may occur in electrical conduction between adjacent objects, e.g., between adjacent bus bars or between a bus bar and a housing.

In general, the block terminals of the related art are devices that facilitate the flow of current and are configured to connect terminals of adjacent objects. These block terminals are different in shape according to a form in which they are installed in a drive motor but are the same in that they connect terminals to be connected to each other.

That is, although the block terminals of the related art are different in shape, press-fit nuts are press-fitted into connection terminals of a bus bar and fastened with bolts to connect a stator connector and a stator terminal.

However, this method of the related art is disadvantageous in that it takes a great deal of time to fasten with bolts and the number of processes increases.

In other words, due to bolting work of press-fitting press-fit nuts, inserting bolts into the press-fit nuts and tightening the bolts, the number of corresponding machine parts increases and the number of assembly processes increases, and therefore, manufacturing costs increase when this method is used.

In addition, a problem, such as warpage of terminals connected to the block terminal due to bolting fastening torque, may occur, and thus, a secondary problem, such as degradation of insulation performance, may also occur.

The above information disclosed in this Background section is only for enhancement of understanding of the background of the invention and, therefore, it may contain information that does not constitute prior art.

SUMMARY

Exemplary embodiments of the present invention are directed to providing a block terminal in which a press-fit pin that is easily detachably attachable without fastening a bolt and a housing cover that improves insulation performance is applied as needed.

The block terminal for a motor and the manufacturing method herein can have the effect that the vibration resistance performance is improved, particularly when insert injection manufacture process is employed. Another advantage of the present invention is a reduction in the number of components, improving the shape of the components, and, thereby, reducing assembly time.

Aspects of the present invention are not limited thereto and other aspects not mentioned herein will be clearly understood by those of ordinary skill in the art from the following description.

An exemplary embodiment of the present invention provides a block terminal including a plurality of bus bars including ring-shaped connection terminals at both ends thereof; a block base formed to surround bodies of the plurality of bus bars excluding the connection terminals. The block base includes a slit passing through a surface thereof; and a housing cover formed to surround a surface of the block base and detachably attached to the block base.

The block base may be insert-injection molded in a state in which the plurality of bus bars are disposed to be spaced apart from each other.

The block base may include insulating plates surrounding the periphery of the connection terminals of the bus bar.

The insulating plates may be arranged at an end of the block base to be spaced apart from each other.

The block base may include insulating plates surrounding the periphery of the connection terminals of the bus bar, and the housing cover may include fixing grooves into which the insulating plates are inserted and fixed.

The housing cover may include a fixing hook configured to be interference-fitted through the slit of the block base.

The housing cover may be formed to at least partially match to a shape of the block base.

Press-fit pins, which are configured to be elastically deformed to cause overlapping of a terminal of a high-voltage connector and a terminal of a stator terminal which are adjacent to each other, may be inserted into the connection terminals of the bus bar.

The press-fit pins may have a diameter larger than diameters of the terminal of the high-voltage connector and the terminal of the stator terminal and may each be provided with a groove having a "+"-shape in a central portion thereof to be elastically deformable.

Another exemplary embodiment of the present invention provides a block terminal including a plurality of bus bars including a multi-bend frame and connection terminals formed at both ends of the frame in a longitudinal direction; press-fit pins, of which lead-in portions are elastically deformed, into which terminals of adjacent objects are fitted and fastened when the press-fit pins are press-fitted into the connection terminals of the bus bar; a block base formed to surround the frame of the bus bar and including insulating plates surrounding the periphery of the connection terminals of the bus bar; and a housing cover formed to surround a surface of the block base.

The block base may have a multi-bent shape corresponding to the frame of the bus bar.

The block base may include reinforcing ribs formed at intervals on each of multi-bent portions thereof.

The block base may include bushings inserted into both ends thereof in a width direction.

The block base may include a plurality of slits formed to pass through a surface thereof.

The housing cover may include fixing hooks to be interference-fitted through the plurality of slits, and fixing grooves into which the insulating plates are inserted and fixed.

The fixing hooks may include an upper hook member and a lower hook member which protrude from the housing cover and are spaced apart from each other and are respectively elastically deformed upward and downward.

The upper hook member may include a flange protruding upward and the lower hook member may include a flange protruding downward, the flanges each including a chamfered lead-in portion which passes through one of the plurality of slits.

The housing cover may be configured to be detachably interference-fitted with the block base.

Another exemplary embodiment of the present invention provides a block terminal including a block base provided with a plurality of press-fit holes in a longitudinal direction; insulating plates protruding from the block base with the plurality of press-fit holes therebetween; and press-fit pins configured to be elastically deformed and into which terminals of adjacent objects are fitted and fastened when the press-fit pins are press-fitted into the plurality of press-fit holes.

Each of the press-fit pins may have a diameter greater than diameters of the terminals of the adjacent objects and include a groove having a "+" shape in a central portion thereof and thus is elastically deformable.

Each of the press-fit pins may include a body portion configured to be press-fitted into one of the press-fit holes; a fastening portion extending to an upper end of the body portion and including a plurality of fastening pieces which are radially divided from the central portion of the body portion provided with a certain groove and taper from bottom to top; and a lead-in portion extending to upper ends of the plurality of fastening pieces and including a plurality of fixing flanges wider than the upper ends of the plurality of fastening pieces.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
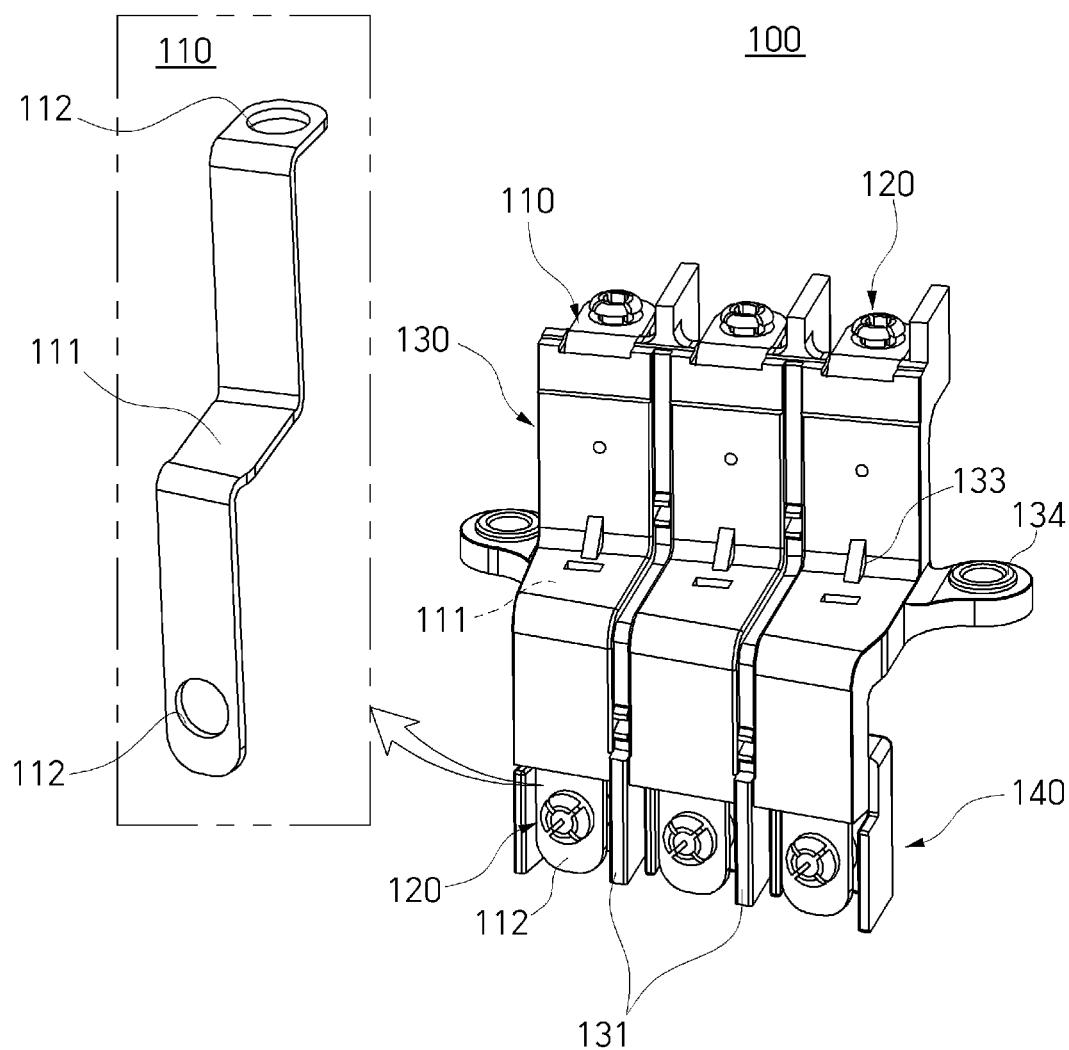
FIG. 1 is a diagram illustrating a block terminal according to an exemplary embodiment of the present invention.

Advantages and features of the present invention and methods of achieving them will be apparent from the following embodiments described in detail in conjunction with the accompanying drawings. However, the present invention is not limited to the embodiments set forth herein and may be embodied in many different forms. The embodiments are merely provided so that the present invention will be thorough and complete and will fully convey the scope of the present invention to those of ordinary skill in the art. The present invention should be defined by the claims. The terminology used herein is for the purpose of describing embodiments only and is not intended to be limiting of the present invention. As used herein, singular forms are intended to include plural forms unless the context clearly indicates otherwise. As used herein, the terms "comprise" or "comprising" specify the presence of stated components, steps, operations and/or elements but do not preclude the presence or addition of one or more other components, steps, operations and/or elements. Like reference numerals in the drawings denote like elements Hereinafter, exemplary embodiments of the present invention will be described in detail with reference to the accompanying drawings.

Figure 2:
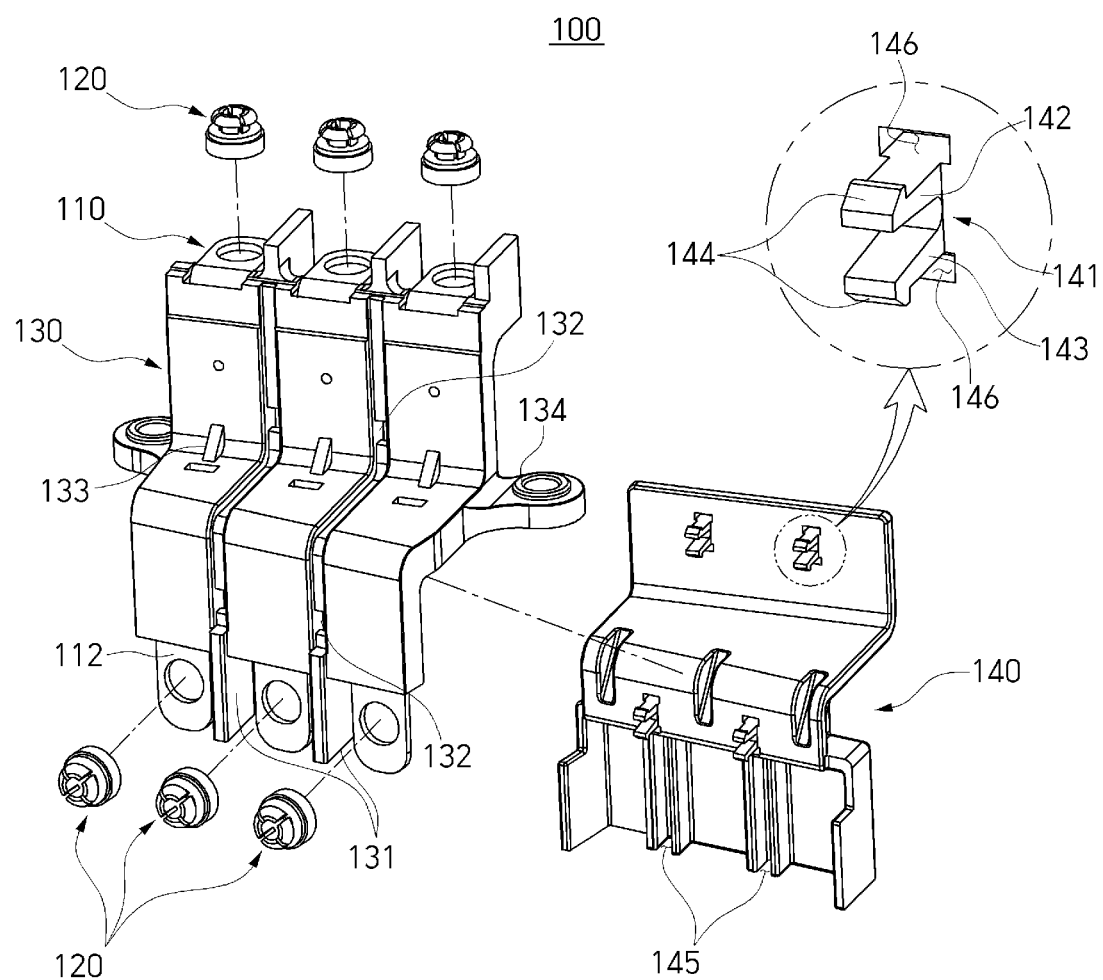
FIG. 2 is a diagram illustrating the relationship in fastening between components of a block terminal according to an exemplary embodiment of the present invention.

FIG. 1 is a diagram illustrating a block terminal according to an exemplary embodiment of the present invention. FIG. 2 is a diagram illustrating the relationship in fastening between components of a block terminal according to an exemplary embodiment of the present invention.

Referring to FIGS. 1 and 2, a block terminal 100 includes bus bars 110, press-fit pins 120, a block base 130, and a housing cover 140.

The bus bar 110 includes a frame 111 bent in multiple stages and connection terminals 112 formed at both ends of the frame 111 in a longitudinal direction. In an example, the bus bars 110 are spaced a certain distance from each other. The connection terminals 112 are formed in a ring shape.

The press-fit pin 120 may be press-fitted into the connection terminal 112 of the bus bar 110. An end (lead-in portion) of the press-fit pin 120 may be formed to be elastically deformed such that a terminal of an adjacent object (not shown) is fitted and fastened thereinto.

The block base 130 may have a multi-bent shape corresponding to the frame 111 of the bus bar 110.

The block base 130 may be formed to surround the frame 111 of the bus bar 110. For example, the block base 130 may be formed to surround the frame 111, excluding the connection terminals 112.

In an example, the block base 130 may be insert-injection molded in a state in which the plurality of bus bars 110 are disposed to be spaced apart from each other. The block base 130 may be formed of an insulating material.

The block base 130 may include insulating plates 131, slits 132, reinforcing ribs 133, and bushings 134.

The insulating plate 131 can surround at least a portion of the periphery of the connection terminal 112 formed at an end of the bus bar 110 to improve insulating performance of the block terminal 100. The insulating plates 131 are arranged at ends of the block base 130 to be spaced apart from each other. The insulating plates 131 may be disposed between the connection terminals 112 to improve insulation performance.

The slits 132 are formed to pass through a surface of the block base 130. The slits 132 are formed in the block base 130 and between the bus bars 110.

The reinforcing ribs 133 are formed at intervals on each of multi-bent portions of the block base 130. The reinforcing ribs 133 have a function of reinforcing strength of the block base 130.

The bushings 134 may be inserted into both ends of the block base 130 in a width direction. In an example, the block base 130 may additionally include insertion holes (not shown) surrounding the bushings 134. In an example, a support (not shown) may be additionally provided at a lower end of the insertion hole to support an edge of the lower end of the bushing 134.

The housing cover 140 may be formed to at least partially surround a surface of the block base 130. The housing cover 140 may be formed to correspond to the shape of the block base 130.

The housing cover 140 may be detachably interference-fitted into the block base 130.

The housing cover 140 may include a fixing hook 141 and a fixing groove 145.

The fixing hook 141 may be configured to be interference-fitted through the slit 132 of the block base 130.

The fixing hook 141 may protrude from the housing cover 140, in which upper and lower hook members 142 and 143 spaced apart from each other may be elastically deformed upward and downward.

The upper hook member 142 may be provided with a flange 144 protruding upward and the lower hook member 143 is provided with a flange 144 protruding downward.

Lead-in portions of the flanges 144 configured to pass through the slit 132 may be chamfered. In an example, the lead-in portions of the flanges 144 are each inclined upward and downward and taper. The flanges 144 allow the fixing hook 141 to be smoothly slide and be inserted into the slit 132 when interference-fitted through the slit 132.

In an example, the upper and lower hook members 142 and 143 are respectively elastically deformed upward and downward when passing through the slit 132.

After the upper and lower hook members 142 and 143 pass through the slit 132, the upper and lower hook members 142 and 143 are returned to their original positions and are fixed while passing through the slit 132.

Lead-out portions of the flanges 144 opposite the lead-in portions may be formed at a right angle to be in close contact with the slit 132. Therefore, the upper and lower hook members 142 and 143 may be fixed while passing through the slit 132.

A core hole 146 in an upper end of the upper hook member 142 and a core hole 146 in a lower end of the lower hook member 143 are configured into which sliding cores (not shown) to form hook shapes are inserted during injection.

The fixing groove 145 may be formed at the bottom of the housing cover 140. The fixing groove 145 is formed such that the insulating plate 131 of the block base 130 is inserted thereinto.

Figure 3:
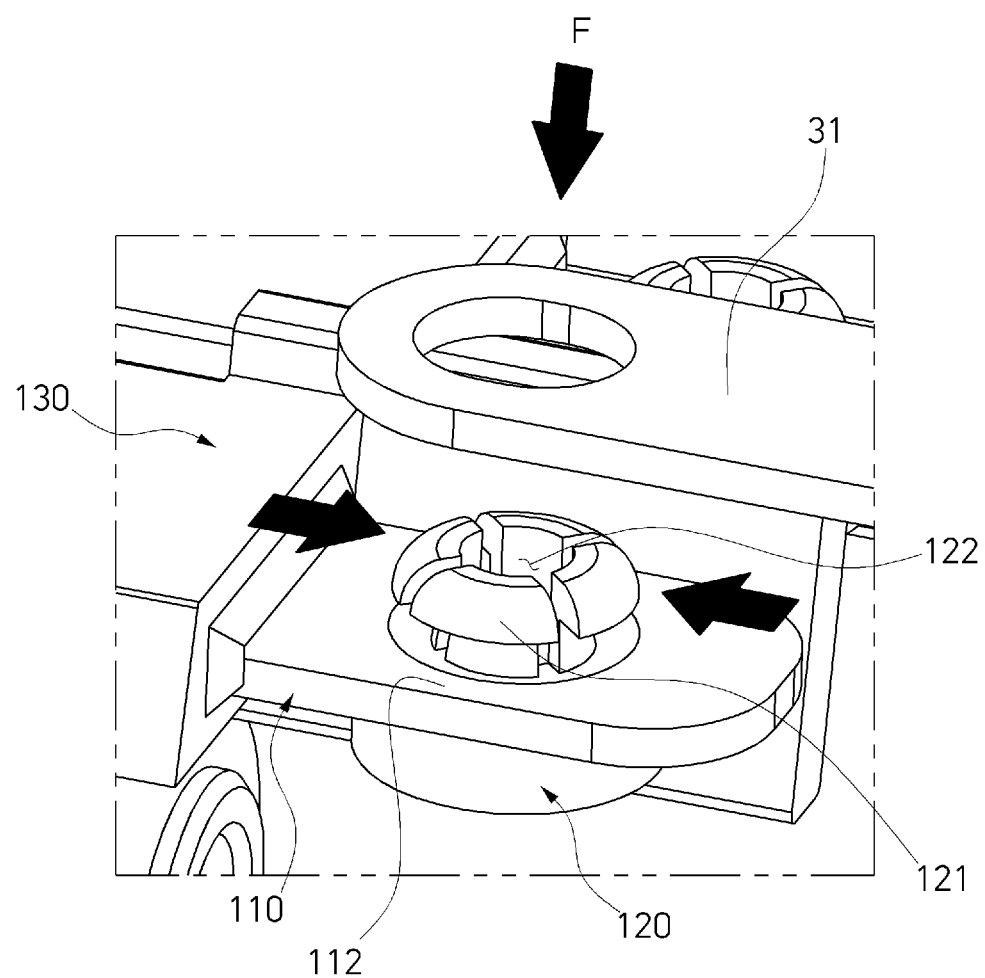
FIGS. 3 and 4 are diagrams schematically illustrating a state in which a block terminal according to an exemplary embodiment of the present invention is fastened to an adjacent object.
Figure 4:
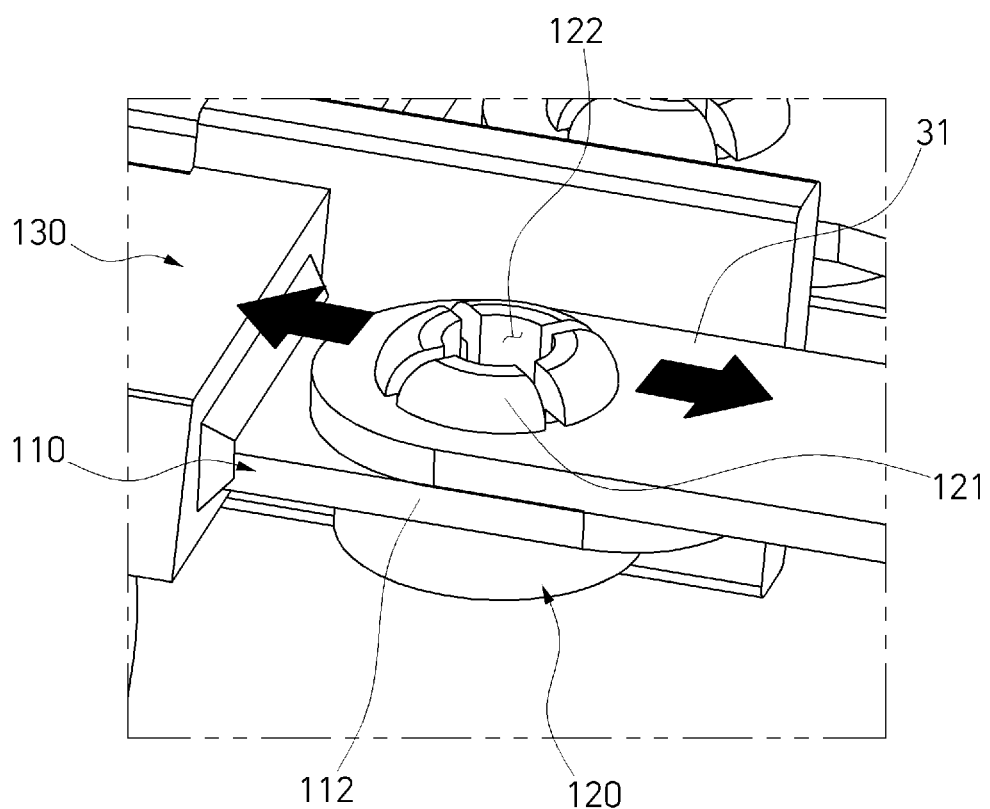

FIGS. 3 and 4 are diagrams schematically illustrating an example of a state in which a block terminal is fastened to an adjacent object.

Referring to FIGS. 3 and 4, a press-fit pin 120 is press-fitted into a connection terminal 112 of a bus bar 110 surrounded by a block base 130.

The press-fit pin 120 may be configured to be elastically deformed to cause overlapping of a terminal of a high-voltage connector (not shown) and a terminal 31 of a stator terminal which are adjacent to each other.

Here, the terminals that may overlap each other due to the press-fit pin 120 are not limited to the terminals of the high-voltage connector and the stator terminal.

FIGS. 3 and 4 are provided to explain a function of the press-fit pin 120 connected to an adjacent object (e.g., the terminal of the high-voltage connector or the terminal 31 of the stator terminal) according to characteristics of a block terminal.

The press-fit pin 120 can have a diameter greater than a diameter of the terminal 31 of the stator terminal which is an object adjacent thereto. The press-fit pin 120 may include a "+"-shaped groove 122 at a central portion thereof and thus may be elastically deformable.

A lead-in portion 121 of the press-fit pin 120 may be retracted into an adjacent terminal (e.g., the terminal 31 of the stator terminal) when the adjacent terminal (e.g., the terminal 31 of the stator terminal) is inserted into the lead-in portion 121 of the press-fit pin 120 by an external pressing force F.

In this case, the lead-in portion 121 of the press-fit pin 120 is elastically deformed in a space of a groove 122. The top of the lead-in portion 121 is chamfered so that the terminal 31 may be smoothly inserted thereinto.

The lead-in portion 121 that may be shrunk when the terminal 31 is inserted into the press-fit pin 120 may be elastically restored to its original position so that the terminal 31 may remain fixed in the press-fit pin 120.

In an example, a terminal (e.g., the terminal 31) of an adjacent object or the like may be easily fixed by the press-fit pin 120 without fastening a bolt.

Figure 5:
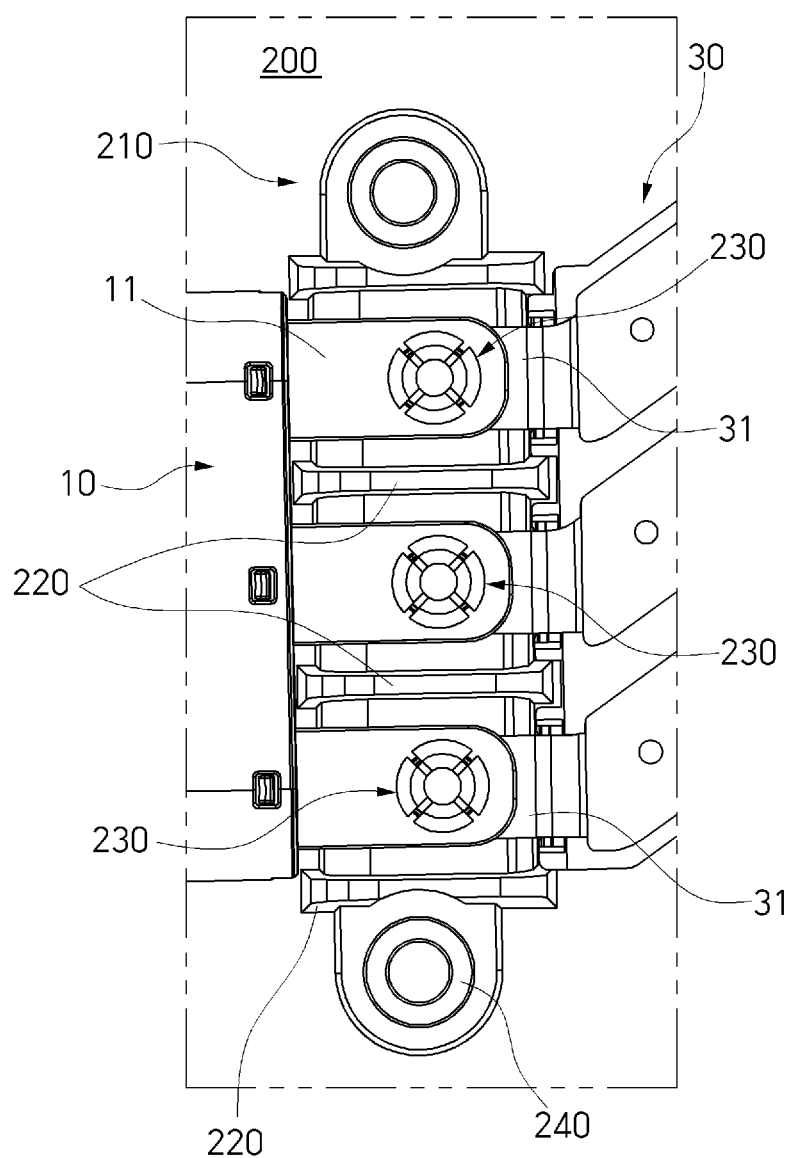
FIG. 5 is a diagram illustrating an example in which a block terminal is fastened, according to an exemplary embodiment of the present invention.
Figure 6:
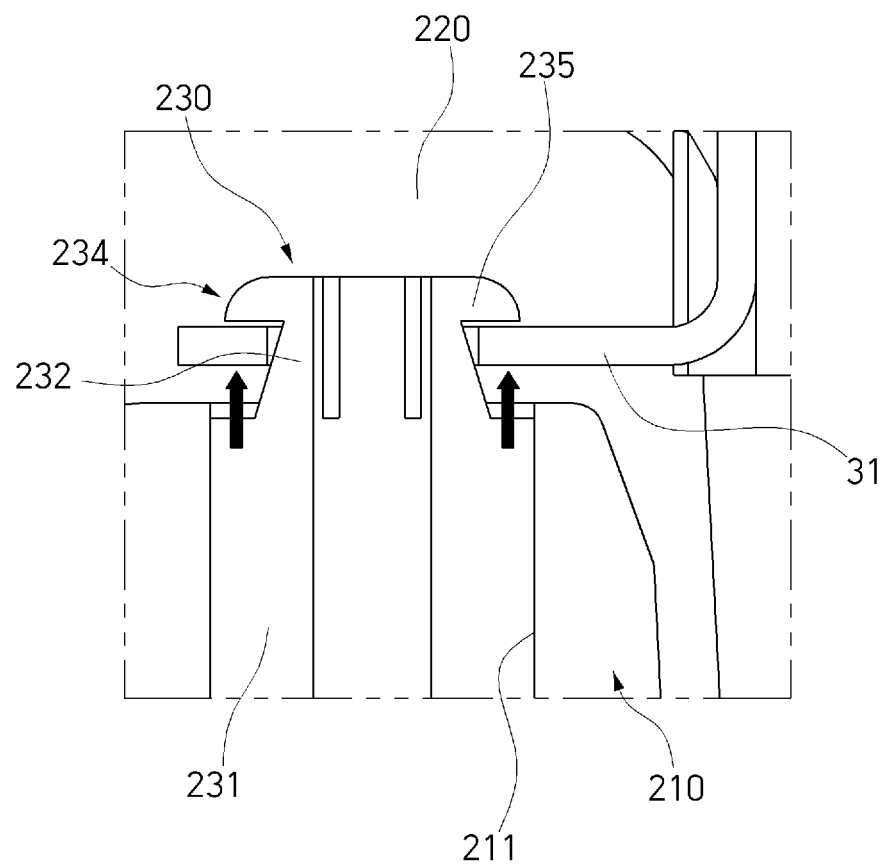
FIG. 6 is a schematic cross-sectional view for explaining a function of a press-fit pin in a block terminal according to an exemplary embodiment of the present invention.
Figure 7:
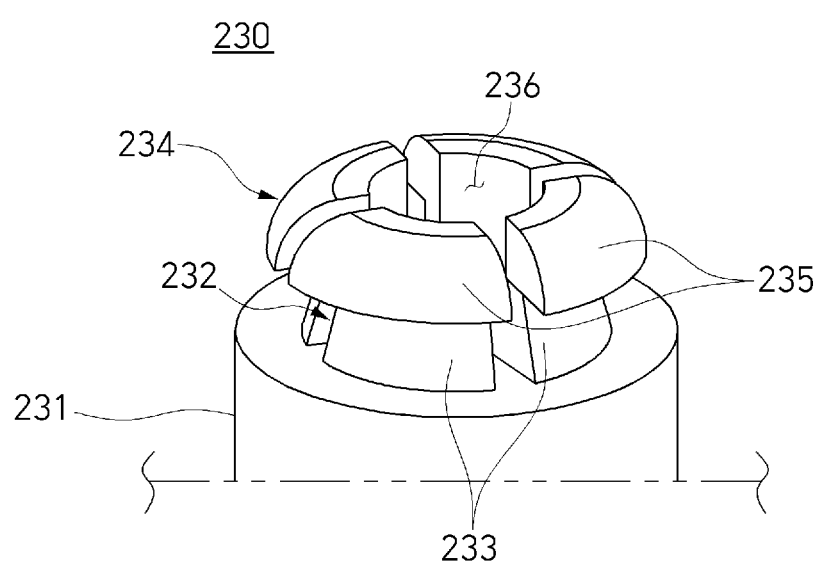
FIG. 7 is a schematic diagram illustrating a press-fit pin in a block terminal according to an exemplary embodiment of the present invention.

FIG. 5 is a diagram illustrating an example in which a block terminal is fastened, according to an exemplary embodiment of the present invention. FIG. 6 is a schematic cross-sectional view for explaining a function of a press-fit pin. FIG. 7 is a perspective view of the press-fit pin.

Referring to FIGS. 5 to 7, a block terminal 200 is configured to simultaneously connect terminals of adjacent objects such that the terminals overlap each other.

The block terminal 200 includes a block base 210, insulating plates 220, and press-fit pins 230.

The block base 210 is provided with a plurality of press-fit holes 211 in a longitudinal direction. The block base 210 forms a "1"-shaped body. The block base 210 may be formed of an insulating material.

The insulating plates 220 may be plates formed of the insulating material and protrude from the block base 210 with the press-fit hole 211 therebetween. In an example, the insulating plates 220 may be disposed to be spaced apart from each other in the longitudinal direction of the block base 210.

The press-fit pin 230 may be configured to be elastically deformed when press-fitted into the press-fit hole 211 so that a terminal 11 of a stator connector 10 and a terminal 31 of a stator terminal 30 which are adjacent objects may be fitted and fastened thereinto.

In an example, the press-fit pin 230 has a diameter greater than a diameter of a terminal of an object adjacent thereto, i.e., diameters of the terminal 11 of the stator connector 10 and the terminal 31 of the stator terminal 30.

Because the press-fit pin 230 includes a "+"-shaped groove 236 in a central portion thereof, the press-fit pin 230 may be shrunk to be inserted into an adjacent object even when the diameter of the press-fit pin 230 is less than that of the adjacent object, and then may be elastically restored after the insertion, thereby securing a fixing force.

A lead-in portion 234 of the press-fit pin 230 may be elastically restored to its original position after being inserted into the terminal 11 of the stator connector 10 and the terminal 31 of the stator terminal 30. The press-fit pin 230 may be secured by a fixing force.

The press-fit pin 230 includes a body portion 231, a fastening portion 232 and the lead-in portion 234.

The body portion 231 may be press-fitted into the press-fit hole 211 of the block base 210.

The fastening portion 232 extends to an upper end of the body portion 231. The fastening portion 232 includes a plurality of fastening pieces 233 radially divided from the central portion provided with the groove 236 having a certain depth and width.

The plurality of fastening pieces 233 taper from bottom to top. In an example, the plurality of fastening pieces 233 are formed in the same shape with the groove 236 having the "+" shape therebetween and are symmetric with each other.

Because the plurality of fastening pieces 233 have inclined planes, the terminals (e.g., the terminals 11 and 31) of the adjacent objects may be inclined toward a hook (the lead-in portion 234) along the inclined planes.

For electrical connection of the terminals 11 and 31, the terminals 11 and 31 should be brought into contact with each other firmly without any free space therebetween. The plurality of fastening pieces 233 may secure effective contact between the terminals 11 and 31 to be inserted.

The lead-in portion 234 extends to upper ends of the plurality of fastening pieces 233. The lead-in portion 234 may include a plurality of fixing flanges 235 wider than the upper ends of the plurality of fastening pieces 233.

The plurality of fixing flanges 235 may be formed in a fan shape with the groove 236 having the "+" shape therebetween. The plurality of fixing flanges 235 may be inclined such that a width thereof decreases from the inside to the outside.

The press-fit pin 230 may have a diameter greater than those of the terminals (the terminals 11 and 31) of the adjacent objects so that the terminals 11 and 31 may be reliably fixed in an inserted state.

The press-fit pin 230 may be configured to be shrunk inward due to the groove 236 having the "+" shape and thus is insertable between the terminals 11 and 31 having small diameters.

The terminals 11 and 31 can be easily inserted and fixed without unnecessarily fastening a bolt and thus the present invention improves convenience.

The present invention is not limited to the above-described embodiments and may be implemented in many different forms within an allowable range of the technical idea of the present invention.

According to the present invention, terminals of adjacent objects can be easily detachably attached using a press-fit pin without fastening a bolt, unlike in the related art. Therefore, the present invention provides a solution to warpage of bus bar, caused by fastening a bolt.

According to the present invention, a process of fastening a bolt is unnecessary and thus a process can be simplified.

In addition, according to the present invention, bus bars are protected with a housing cover and thus insulation performance can be improved.

Although the present invention has been described in detail above with reference to the exemplary embodiments, those of ordinary skill in the technical field to which the present invention pertains should be able to understand that various modifications and alterations can be made without departing from the technical spirit or essential features of the present invention. Therefore, it should be understood that the disclosed embodiments are not limiting but illustrative in all aspects. The scope of the present invention is defined not by the above description but by the following claims, and it should be understood that all changes or modifications derived from the scope and equivalents of the claims fall within the scope of the present invention.

What is claimed is:

1. A block terminal of a vehicle driving motor, the block terminal comprising:

a plurality of bus bars, each bus bar including ring-shaped connection terminals at both ends thereof;

a block base formed to surround bodies of the plurality of bus bars excluding the connection terminals, wherein the block base includes a slit passing through a surface thereof; and a housing cover formed to surround a surface of the block base and detachably attached to the block base, wherein the housing cover includes a fixing hook configured to be interference-fitted through the slit of the block base.

2. The block terminal of claim 1, wherein the block base is insert-injection molded in a state in which the plurality of bus bars are disposed to be spaced apart from each other.

3. The block terminal of claim 1, wherein:

the block base includes insulating plates, each of the insulating plates surrounding the periphery of each of the connection terminals of the plurality of bus bars; and the housing cover includes fixing grooves into which the insulating plates are inserted and fixed.

4. The block terminal of claim 1, wherein the housing cover is formed to at least partially match to a shape of the block base.

5. The block terminal of claim 1, wherein the block base includes insulating plates surrounding the periphery of the connection terminals of the plurality of bus bars.

6. The block terminal of claim 5, wherein the insulating plates are arranged at an end of the block base to be spaced apart from each other.

7. A block terminal of a vehicle driving motor, the block terminal comprising:

a plurality of bus bars, each bus bar including ring-shaped connection terminals at both ends thereof;

a block base formed to surround bodies of the plurality of bus bars excluding the connection terminals, wherein the block base includes a slit passing through a surface thereof;

a housing cover formed to surround a surface of the block base and detachably attached to the block base; and press-fit pins inserted into the connection terminals of the plurality of bus bars, wherein each of the press-fit pins is elastically deformable to connect at least one other terminal to each of the connection terminals.

8. The block terminal of claim 7, wherein:

a diameter of each of the press-fit pins is greater than a diameter of the at least one other terminal to be connected to each of the connection terminals; and each of the press-fit pins include a groove having a "+"-shape in a central portion thereof to be elastically deformable.

9. A block terminal of a driving motor, the block terminal comprising:

a plurality of bus bars, each buss bar including a multi-bend frame and connection terminals formed at both ends of the multi-bend frame in a longitudinal direction;

press-fit pins including lead-in portions, wherein the lead-in portions are elastically deformable into which terminals of adjacent objects are fitted and fastened when the press-fit pins are press-fitted into the connection terminals of the bus bar;

a block base formed to at least partially surround the frames of the plurality of bus bars, wherein the block base includes insulating plates surrounding the periphery of the connection terminals of the plurality of bus bars; and a housing cover formed to surround at least a portion of a surface of the block base.

10. The method of claim 9, wherein the block base includes bushings inserted into both ends thereof in a width direction.

11. The block terminal of claim 9, wherein the housing cover is detachably interference-fitted with the block base.

12. The method of claim 9, wherein the block base has a multi-bent shape corresponding to a shape of the frames of the plurality of bus bars.

13. The block terminal of claim 12, wherein the block base includes reinforcing ribs formed at intervals on each of multi-bent portions thereof.

14. The method of claim 9, wherein:

the block base includes a plurality of slits formed to pass through a surface thereof; and the housing cover includes:

fixing hooks to be interference-fitted through the plurality of slits; and fixing grooves into which the insulating plates are inserted and fixed.

15. The block terminal of claim 14, wherein:

the fixing hooks include an upper hook member and a lower hook member which protrude from the housing cover to be spaced apart from each other; and the fixing hooks are respectively elastically deformed upward and downward.

16. The block terminal of claim 15, wherein:

the upper hook member includes a flange protruding upward; and the lower hook member includes a flange protruding downward, the flanges each including a chamfered lead-in portion configured to pass through at least one of the plurality of slits.

* * * * *